US005597050A

United States Patent [19]

Johnson

[11] Patent Number: 5,597,050

[45] Date of Patent: Jan. 28, 1997

[54] RETAINING AND SUPPORT ASSEMBLY FOR MACHINERY LIFT PLATFORMS

[76] Inventor: Rodney G. Johnson, P.O. Box 231, Robina, Gold Coast, Queensland, Australia, 4226

[21] Appl. No.: 208,216

[22] Filed: Mar. 10, 1994

[30] Foreign Application Priority Data

Mar. 11, 1993 [AU] Australia ................................ PL7733

[51] Int. Cl.[6] ........................................ B60R 3/02

[52] U.S. Cl. ................................ 182/2; 182/91; 280/166

[58] Field of Search ................................ 182/2, 91, 141, 182/63; 280/166

[56] References Cited

U.S. PATENT DOCUMENTS

| | | | |
|---|---|---|---|
| 533,998 | 2/1895 | McKiever | 182/206 |
| 4,029,355 | 6/1977 | Wilhelmsen | 280/166 X |
| 4,217,971 | 8/1980 | Rivinius | 280/166 |

*Primary Examiner*—Alvin C. Chin-Shue

*Attorney, Agent, or Firm*—Hoffman, Wasson & Gitler, P.C.

[57] ABSTRACT

A retaining and support assembly for supporting a lift platform or cage at an elevated position on machinery, the lift platform or cage having an engagement plate which may located between a stop and retractable pin supported on the machinery so as to be wedged in position to support the platform or cage. The pin may be retracted to allow for release of the platform or cage from its elevated position.

14 Claims, 4 Drawing Sheets

RETAINING AND SUPPORT ASSEMBLY FOR MACHINERY LIFT PLATFORMS

TECHNICAL FIELD

THIS INVENTION relates to a retaining and support assembly for an operator platform or cage as used in large size earth moving equipment, mining equipment or other similar equipment.

BACKGROUND ART

A number of movable platforms or cages are currently known for lifting an operator, other personnel or equipment, from ground level to an elevated position on large sized machinery, such as machinery used in the mining or earth moving industry where the operator or other personnel may alight adjacent to the cab of the vehicle, or where equipment may be unloaded. Such platforms or cages also serve for lowering the operator, personel or equipment from that elevated position. Examples of such platforms or cages are shown in U.S. Pat. Nos. 3,986,724 and 4,217,971. Support devices are provided to hold the platform or cage in its elevated position adjacent to the vehicle. The currently known support devices however, have proved difficult to use and do not support the platform or cage in a stable secure position adjacent to the vehicle cab. Additionally, moving the platform or cage to a position where it may be engaged by the known support devices has also proved difficult.

SUMMARY OF THE INVENTION

The present invention aims to overcome or alleviate the above disadvantages by providing an improved retaining and support assembly which will serve to stably support a lift platform or cage to machinery when raised to its elevated position. The present invention further aims to provide a retaining and support assembly from which the platform or cage may be easily released to enable lowering of the platform or cage from its elevated position. Other objects and advantages of the invention will become apparent from the following description.

The present invention thus provides in a first aspect a retaining and support assembly for supporting a lift platform or cage at an elevated position on machinery, said assembly including support means adapted to be located on said machinery at the desired elevated position of said platform or cage, said support means including a stop and a releasable support member spaced from said stop, said support means being adapted to receive between said stop and said support member engagement means on said lift platform or cage so as to support said platform or cage at said elevated position, said support member being releasable to permit said engagement means and platform or cage to be moved away from said elevated position.

Preferably the releasable support member comprises a pin movable between an extended supporting position and a retracted releasing position. Preferably the pin is biased to its extended supporting position. The biasing means may comprise a spring. The stop is laterally spaced from the releasable support member and normally located adjacent the machinery.

The engagement means of the platform or cage is suitably supported between the stop and support member in a wedge-like fashion and for this purpose the engagement means preferably tapers in width by having at least one side edge which is inclined to the vertical, downwardly and inwardly towards the opposite side edge. In one form, opposite side edges of the engagement means are inclined inwardly and downwardly towards each other so that the engagement means is of tapered form. A lug is also suitably provided at the lower end of the engagement means, the lug being adapted to engage the stop on the support means to limit upward movement of the engagement means during positioning of the engagement means relative to the support members and stop. The engagement means is suitably in the form of a planar plate affixed to one side of the platform or cage.

In the engaged position the support member is extended and located adjacent the or one of the inclined edges of the engagement means. Means are preferably provided to cause retraction of the support member. Such means may comprise a pivotal arm on the platform or cage which may be moved to engage the leading end of the support member to cause retraction thereof to release the engagement means and permit movement of the cage or platform from its elevated position.

BRIEF DESCRIPTION OF DRAWINGS

In order that the invention may be more readily understood and put into practical effect, reference will now be made to the accompanying drawings which illustrate a preferred embodiment of the invention and wherein.

DETAILED DESCRIPTION OF THE EMBODIMENT

Figure 1:
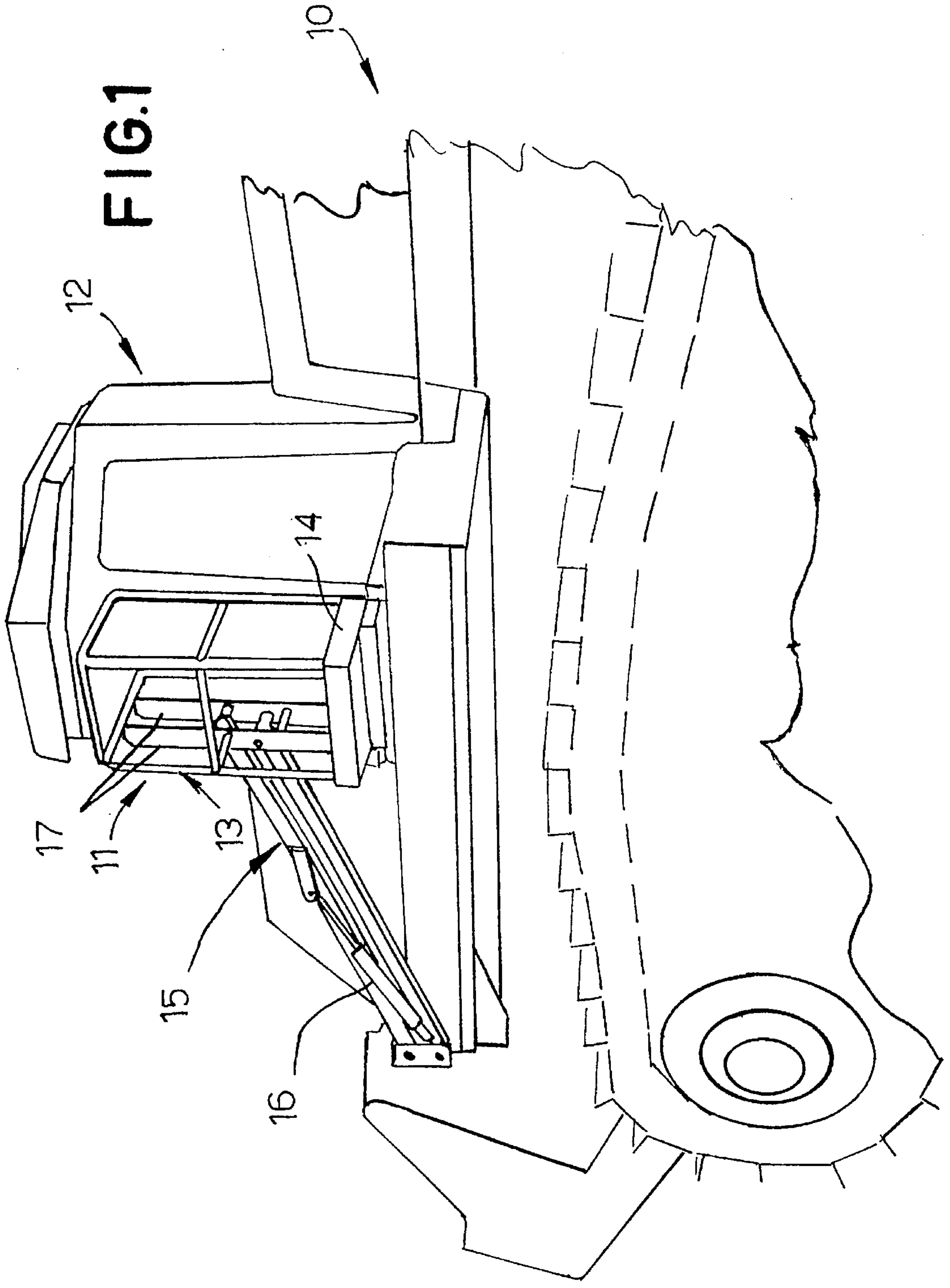
FIG. 1 illustrates a machine provided with a lift platform or cage and incorporating a retaining and support assembly according to the present invention.

Referring to the drawings and firstly to FIG. 1, there is illustrated machinery 10 such as large scale mining or earth moving machinery provided with a lifting platform or cage assembly 11 for lifting an operator, personnel or equipment from ground level to a position adjacent the cab 12 of the vehicle and for lowering an operator, personnel or equipment from the cab 12 to ground level. The platform or cage assembly 11 as is known in the art includes in this embodiment a cage 13 and a platform 14 for the operator, personnel or equipment and a parallelogram linkage assembly 15 actuated by means of a ram 16 for raising and lowering the platform 14 and cage 13 and for maintaining the platform 14 and cage 13 in a horizontal or substantially horizontal attitude during its movement. Such an arrangement is disclosed in the aforesaid U.S. patents. The platform or cage assembly 11 includes on one side a pair of spaced apart upright members 17 and the linkage assembly 15 is pivotally mounted to the cage assembly 11 via horizontal pivot pins 18 which extend between the opposite members 17 (see FIG. 7).

Figure 2:
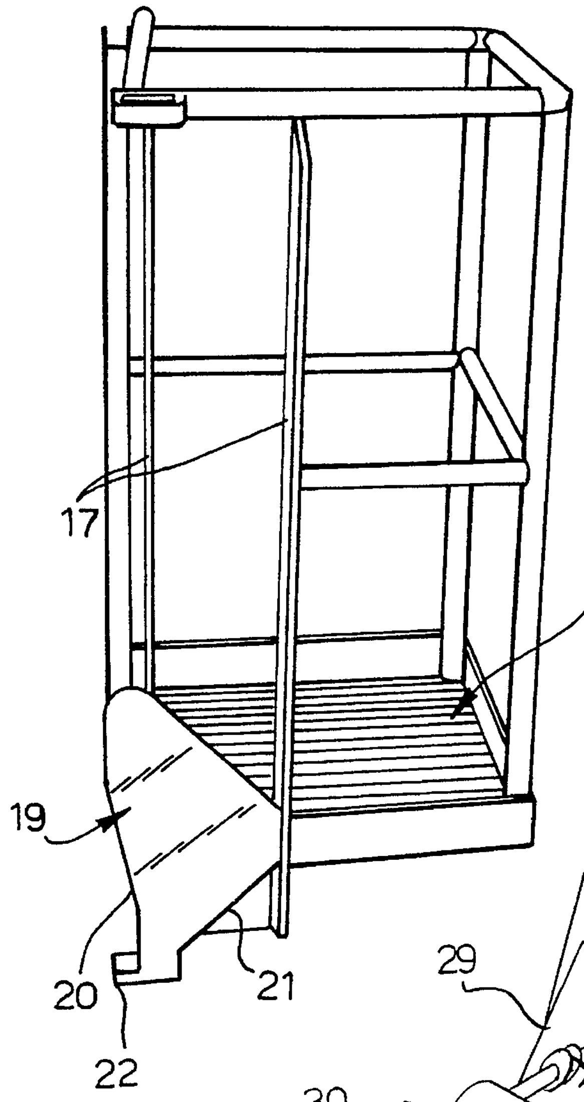
FIG. 2 illustrates a platform or cage incorporating the engagement means for co-operation with the retaining and support assembly on the machine.
Figure 7:
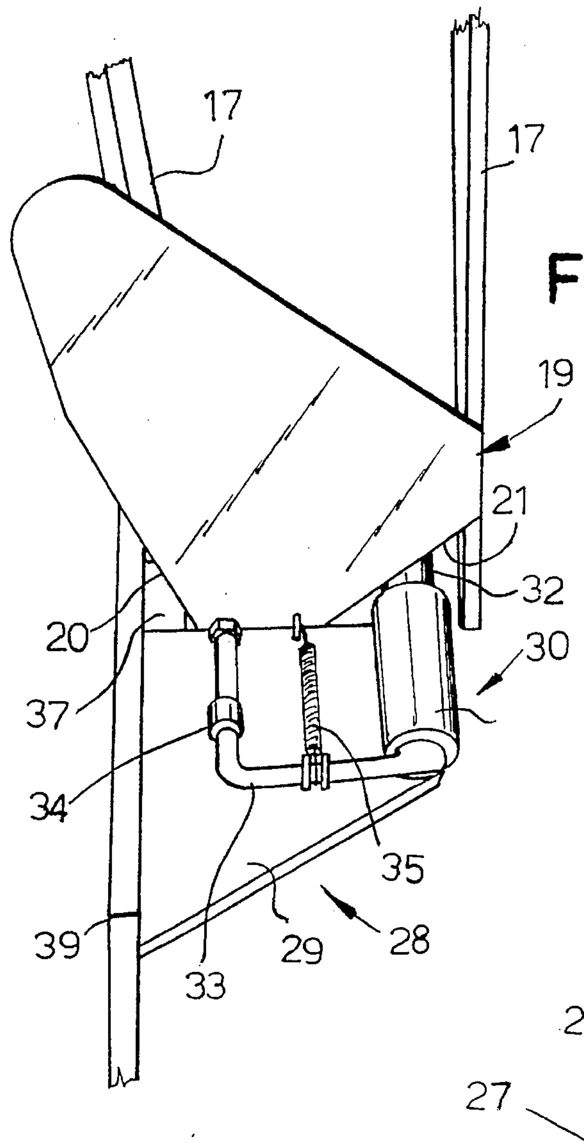
FIG. 7 illustrates the co-operation between the engagement means on the platform or cage and the retaining and support assembly on the machine in the supported position of the platform or cage.
Figure 8:
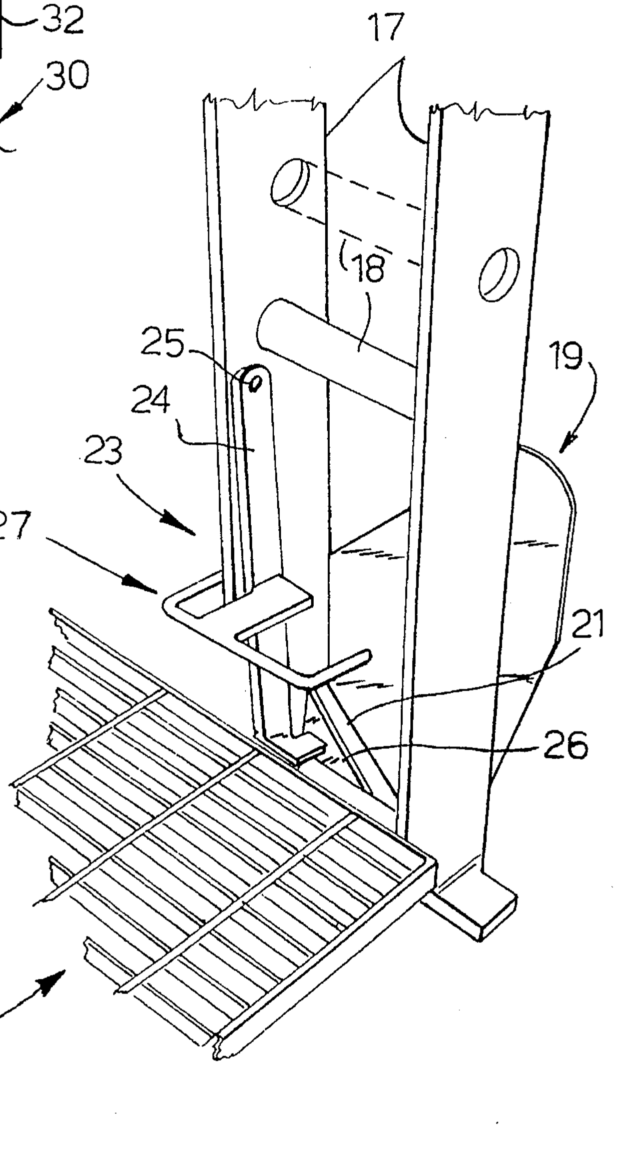
FIG. 8 illustrates the releasing device for the retaining and support assembly.

As shown more clearly in FIGS. 2 and 7, the members 17 also support on one side of the platform 14 a support and engagement plate 19 which is of generally planar form and arranged in a substantially vertical plane, the plate 19 having opposite downwardly and inwardly inclined side edges 20 and 21 so that the plate 19 has a downwardly tapering width. Arranged at the lower end of the plate 18 is a lug 22 which is directed to one side of the platform assembly 13 and normally towards the machinery 10. One of the upright members 17 additionally supports a releasing assembly 23 (see FIG. 8) which comprises an arm 24 pivotally supported to the member 17 at 25 and including at its lower end an abutment face 26 which is shaped so as to be complementary to the edge 21. The arm 24 may also be provided with an actuating handle 27.

Figure 3:
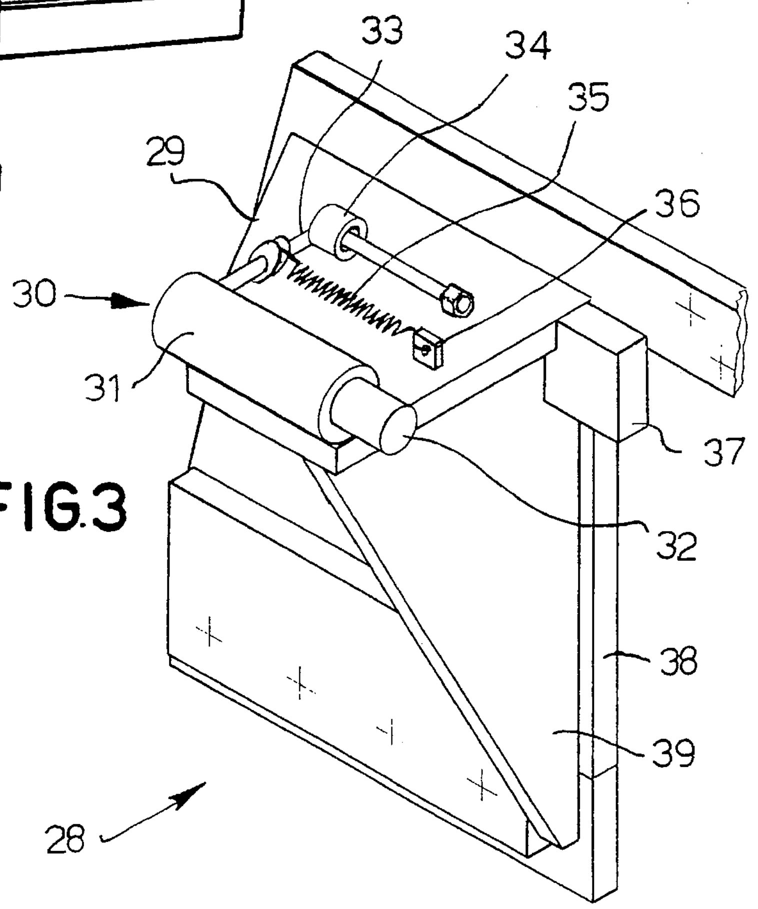
FIG. 3 illustrates the retaining and support assembly adapted mounting to the machine.

Secured to the machinery 10, adjacent the vehicle cab 12 is a retaining and support assembly 28 (see FIG. 3). The assembly 28 includes an outwardly extending generally horizontal ledge 29 which carries a support pin assembly 30 which includes a tubular guide 31 fixed to the ledge 29, a pin 32 arranged for sliding movement within the guide 31, and an L-shaped guide arm 33 guided for movement in a tubular bush 34 fixed to the ledge 29. A spring 35 extends between the arm 33 and a lug 36 on the ledge 29 to normally bias the pin 32 to its position shown in FIG. 3 where it is extended outwardly beyond the side of the ledge 29. The assembly 28 additionally incorporates a stop 37 on the pin side of the ledge 29 spaced laterally from the pin 32, the stop 37 also extending to one side of the ledge 29. The ledge 29 is supported to a base plate 38 which is adapted to be secured to the machinery 10 by welding or bolting in a generally vertical orientation. A triangular bracing member 39, braces the ledge 29 to the base plate 38. When the assembly 28 is mounted to the machinery 10, the stop 37 is located adjacent the machinery 10 and the pin 32 spaced outwardly therefrom.

Figure 4:
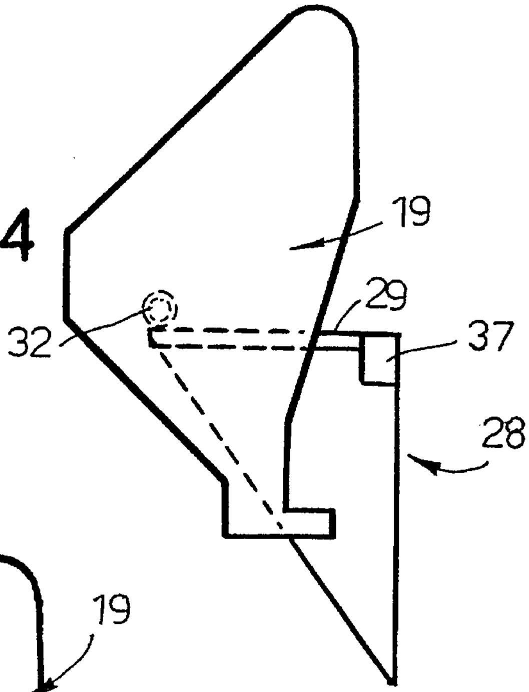
FIG. 4 to 6 illustrate the movement of the engagement means to its supported position in the retaining and support assembly.
Figure 5:
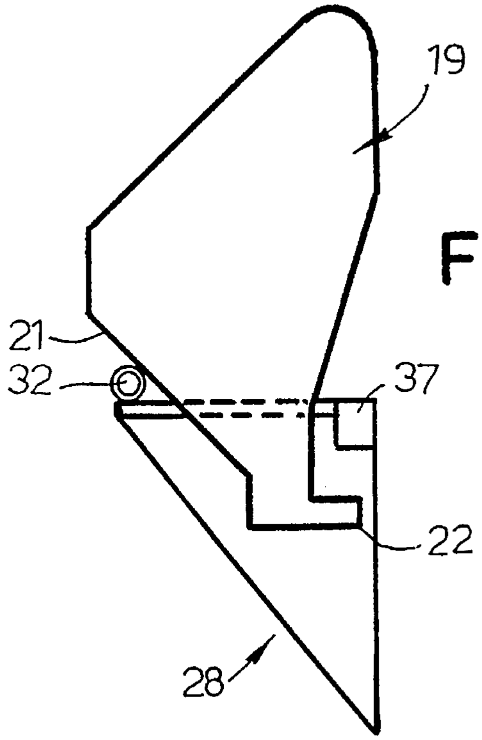
Figure 6:
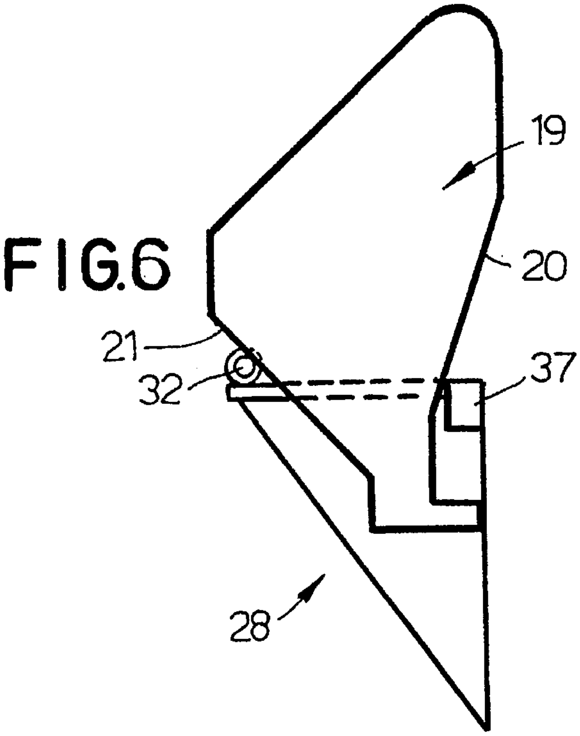

In use the ram 16 is actuated to lift via the linkage assembly 15 the platform 14 and cage 13 towards the elevated position of FIG. 1. As the platform and cage 13 are moved upwardly and inwardly towards the cabin 12, the plate 19 when adjacent the cabin 12 will usually initially engage the pin 32 and push the pin 32 in, to cause retraction thereof against the bias of the spring 35 (see FIG. 4). Sideways movement of the cage 13 along the machine 10 will be constrained by engagement of the plate 19 with the ledge 29 and inward movement towards the machine 10 limited by engagement of the plate 19 with the stop 37. As the platform 14 and cage 13 is continued to be elevated, as shown in FIG. 5, the end of the pin 32 will slide relatively over the plate 19 until it moves beyond the edge 21 at which point the spring 35 cause the pin 32 to move to its extended position shown in FIGS. 3 and 5 beneath the edge 21 of the plate 19. In this position upward movement of the platform 14 and cage 13 and plate 19 will be restrained because the lug 22 at the end of the plate 19 will contact the stop 37 on the assembly 28. When the hydraulic pressure in the ram 16 is released, the platform 14 and cage 13 will be allowed to lower and the opposite inclined edges 20 and 21 of the plate 19 will abut against, and be wedged between the stop 37 and pin 32 respectively, so that the platform 14 and cage 13 is fully supported in its elevated attitude as shown in FIGS. 6 and 7.

Where it is desired to lower the platform 12 and cage 13, hydraulic pressure is applied to the ram 16 to slightly raise the platform 14 and cage 13 to lift the plate 19 from the pin 32, for example, to the position of FIG. 5. The arm 24 is then pivoted outwardly using the handle 27 so that the abutment face 26 engages the pin 32 causing it to be retracted and moved free of the edge 21. The platform 14 and cage 13 are thereafter free to be moved outwardly and downwardly of the machinery 10 via the parallelogram linkage 15 to lower the platform 14 and cage 13 to the ground.

The retaining and support assembly 28 thus proves an effective means for supporting the platform assembly 11 at an elevated attitude by receiving the engagement plate 19 of the platform assembly 11. The wedging action between the plate 19 and the pin 32 and stop 37 provides for secure support of the platform assembly 11 at this position. This support, however, can be readily released by retraction of the pin 32 so that the platform assembly 11 may be moved away from its supported attitude. The arrangement above has been described with reference to large scale earth moving or mining equipment but may be applied to any large scale machinery employing a lift platform assembly 11.

The assembly of the invention is preferably fabricated from steel components but may include cast components or be formed of any other materials.

It will be appreciated that many variations and modifications may be made to the embodiment described above without departing from the broad scope and ambit of the invention. For example, the retractable pin assembly 30 may be replaced by other equivalent mechanisms such as a pivotal support member which can move between an extended support position and a retracted position. Additionally, the plate 19 may have only one side edge which is inclined inwardly and downwardly. The plate 19 may also be replaced by separate members which form the or both inclined side edges to obtain the wedging action. All other variations and modifications as would be apparent to persons skilled in the art are deemed to fall within the broad scope and ambit of the invention as herein defined in the appended claims.

I claim:

1. In combination, a lift platform assembly, and a retaining and support assembly for said lift platform assembly, said platform assembly being adapted to be mounted to machinery for movement between a lowered position and an elevated position, said retaining and support assembly being adapted to be mounted to said machinery at said elevated position, said platform assembly including engagement means and said retaining and support assembly including a stop and a pin, said pin being movable between an extended position and a retracted position, said engagement means being receivable between said stop and said pin in its extended position so that said platform assembly is supported at said elevated position, said platform means including releasing means for engaging said pin to move said pin to said retracted position to release said engagement means of said platform assembly and permit said platform assembly to be moved away from said elevated position.

2. The combination according to claim 1 wherein said engagement means includes opposite side edges adapted for abutment with the respective said members for supporting said platform assembly at said elevated position.

3. The combination according to claim 2 wherein one said side edge is inclined inwardly and downwardly towards the other said side edge, whereby said engagement member may be wedged between said members.

4. The combination according to claim 3 wherein said opposite side edges of said engagement means are inclined inwardly and downwardly towards each other such that said engagement means has a tapering width.

5. In combination, a lift platform assembly adapted to be mounted to machinery and a retaining and support assembly for said lift platform assembly, said platform assembly being adapted to be mounted to machinery for movement between a lowered position and an elevated position, said platform assembly including engagement means including a planar member secured to said platform assembly and having at least one inclined edge, and said retaining and support assembly including spaced apart members for receiving said engagement means therebetween in a wedgelike manner so as to support said platform assembly at said elevated position, and wherein at least one of said members of said retaining and support assembly is mounted so as to be selectively movable to release said engagement means and permit said platform assembly to be moved away from said elevational position.

6. In combination, a lift platform assembly adapted to be mounted to machinery and a retaining and support assembly for said lift platform assembly, said platform assembly being adapted to be mounted to machinery for movement between a lowered position and an elevated position, said platform assembly including engagement means, and said retaining and support assembly including spaced apart members for receiving said engagement means therebetween, in a wedge-like manner, so as to support said platform assembly at said elevated position, and wherein at least one of said members of said retaining and support assembly comprises a pin movable between an extended position, in which said pin can be engaged by said engagement means, and a retracted position, in which said engagement means is released and said platform assembly can be moved away from said elevated position.

7. The combination of claim 6, wherein said platform assembly includes a releasing member actuable to engage said pin and cause said pin to move to said retracted position.

8. The combination of claim 6, wherein said pin is biased to its extended position by biasing means.

9. In combination, a lift platform assembly adapted to be mounted to machinery and a retaining and support assembly for said lift platform assembly, said platform assembly being adapted to be mounted to machinery for movement between a lowered position and an elevated position, said platform assembly including engagement means having opposed convergent side edges and a lug, and said retaining and support assembly including spaced apart members for receiving said engagement means therebetween in a wedgelike manner, wherein said side edges abut the respective spaced apart members so as to support said platform assembly at said elevated position, and wherein at least one of said members of said retaining and support assembly is mounted so as to be selectively movable to release said engagement means of said platform assembly, and permit said platform assembly to be moved away from said elevated position, and said lug is adapted to cooperate with the other of said members to limit upward movement of said platform assembly.

10. In combination, a lift platform assembly adapted to be mounted to machinery and a retaining and support assembly for said lift platform assembly, said platform assembly being adapted to be mounted to machinery for movement between a lowered position and an elevated position, said platform assembly including engagement means of generally planar form secured to one side thereof, and said retaining and support assembly including spaced apart members for receiving said engagement means therebetween in a wedge-like manner, so as to support said platform assembly at said elevated position, so as to support said platform assembly at said elevated position, and wherein at least one of said members of said retaining and support assembly is mounted so as to be selectively movable to release said engagement means of said platform assembly, and permit said platform assembly to be moved away from said elevated position.

11. The combination according to claim 10 wherein said platform assembly includes a platform and spaced apart upright members and wherein said engagement means is secured in a substantially vertical attitude to said spaced upright members.

12. In combination, a lift platform assembly adapted to be mounted to machinery and a retaining and support assembly for said lift platform assembly, said platform assembly being adapted to be mounted to machinery for movement between a lowered position and an elevated position, said platform assembly including engagement means and said retaining and support assembly including spaced apart members for receiving said engagement means therebetween in a wedge-like manner so as to support said platform assembly at said elevated position and wherein one of said members of said retaining and support assembly comprises a pin selectively retractable to release said engagement means of said platform assembly and permit said platform assembly to be moved away from said elevated position.

13. The combination according to claim 12 and including biasing means for biasing said pin to an extended position.

14. The combination according to claim 13 wherein said platform assembly includes a releasing member aligned with said pin in said elevated position of said platform assembly, said releasing member being movably mounted to said platform assembly and being actuable to engage and cause retraction of said pin to release said platform assembly from its supported elevated position.

* * * * *